Nov. 30, 1965  T. M. KOSTI ETAL  3,221,222
SEMI-CONDUCTOR DEVICES
Filed May 20, 1960
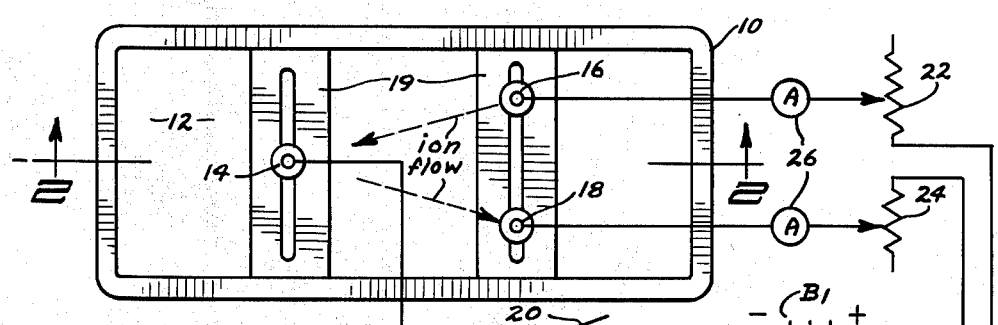
FIG. 1
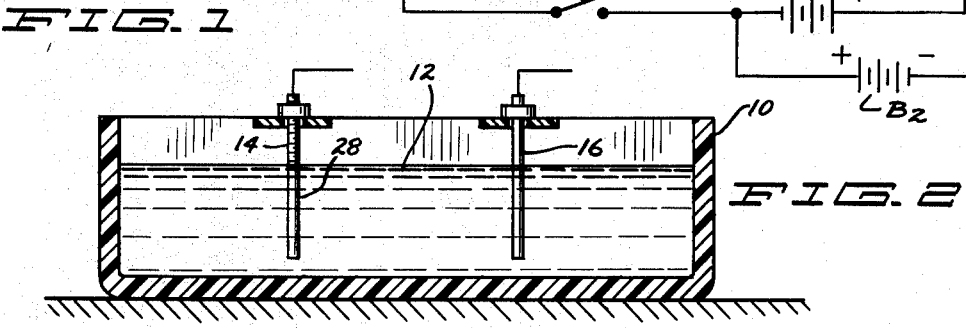
FIG. 2
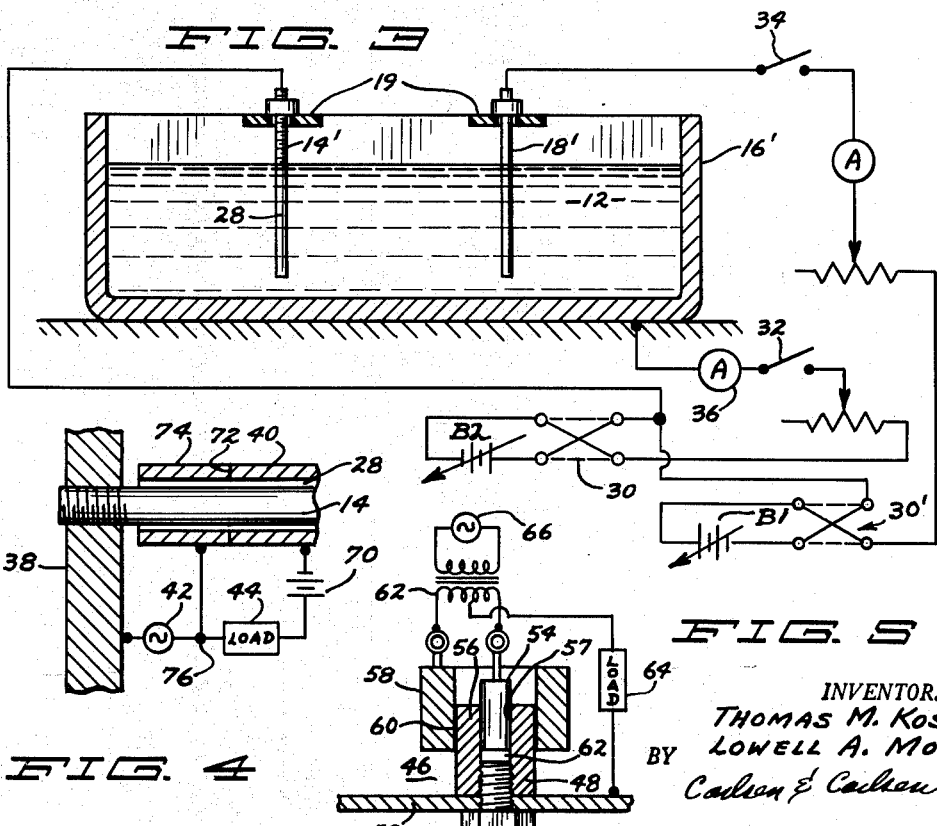
FIG. 3
FIG. 4
FIG. 5
INVENTORS
THOMAS M. KOSTI
LOWELL A. MOE
BY Carlsen & Carlsen
ATTORNEYS

United States Patent Office 3,221,222
Patented Nov. 30, 1965

3,221,222
SEMI-CONDUCTOR DEVICES
Thomas M. Kosti, Chicago, Ill., and Lowell A. Moe, Minneapolis, Minn., assignors to F. H. Peavey & Company, Minneapolis, Minn., a corporation of Minnesota
Filed May 20, 1960, Ser. No. 30,507
3 Claims. (Cl. 317—238)

This invention relates to methods of electroplating electrical barrier layers, such as used for making electric current rectifiers, and the like, and to rectifiers impervious to high operating temperatures and other adverse operating conditions.

Rectifiers, according to this invention, are characterized by the use of an electropositive electrode in electric circuit relation with an insulating metallic oxide having a different metal integrally associated therewith in its crystal lattice to form an unidirectional current conducting layer and an electronegative electrode on the opposite side of the layer. The rectifying layer is characterized by insensitivity to extreme temperature and its resistance to oxidation or reduction by environmental conditions. The degree of resistive asymmetry in each layer is variable from unity upwardly.

An object of the present invention is to provide an electrolytic deposition method for forming a rectifying layer of the oxide type on an electrode in which the constituents thereof may be simultaneously deposited.

It is an other object to provide a method of forming a rectifying barrier wherein the electrical asymmetry is in part determined by reversing the electrolytic forming process during layer formation.

It is another object of the present invention to provide a novel method of electroplating a resistive barrier layer of material the asymmetric properties of which are determined by the amount of metal in a dielectric oxide formed by anodization.

These and other more detailed and specific objects will be disclosed in the course of the following specification, reference being had to the accompanying drawings, in which—

FIG. 1 is a diagrammatic plan view of apparatus in which the methods of this invention may be performed.

FIG. 2 is a partial vertical sectional view of the FIG. 1 apparatus as viewed along the lines 2—2.

FIG. 3 is a vertical sectional diagrammatic view of an alternate apparatus which may be used to carry out the methods of this invention.

FIG. 4 shows a rectifier fabricated according to the teachings of this invention as used in a typical electrical circuit and how the rectifier can be modified to form a transistor.

FIG. 5 shows a full-wave rectifier constructed according to the teachings of this invention and as connected in a usual rectifying circuit.

Referring now more particularly to FIGS. 1 and 2 there is shown an apparatus in which the novel methods of this invention for forming electrically resistive layers may be performed. A ceramic and rectangular tank 10 contains a sulphuric acid bath 12 in which an aluminum-rod electrode 14, zinc cathode 16 and a metallic arsenic anode 18 are partially immersed. The electrode support bars 19 consisting of electrically insulating material support the respective electrodes as shown. The separate and independent battery sources B1 and B2 are connected with the said electrodes to form two independent electrical circuits having a common junction in the electrode 14 on which the electrically resistive coating is to be formed. The battery B1 has its cathode, or negative terminal, connected to the anode, or positive terminal, of the battery B2 and to the electrode 14 through the control switch 20. The battery B1 positive terminal, or anode, is connected through the rheostat 24 to the anode 18. By closing switch 20 metallic arsenic will be removed from the anode 18 and electroplated onto the electrode 14 as is well known in the electroplating art. Simultaneously therewith a current provided by the battery B2 flows from the electrode 14 to the zinc cathode 16 and the rheostat 22 for oxidizing, by anodization, the electrode 14 surface.

The above described circuits are for conventional current, it being understood that the electron travel is in the opposite direction.

It is believed that the plated arsenic and anodized formed oxide coating on the electrode 14 are integrally inter-related to modify the dielectric or insulating properties of the oxide coating to form either a linear resistive layer or the rectifying barrier layer which exhibits the usual asymmetric resistances as will be later fully described.

By adjusting the two rheostats 22 and 24, as indicated by the ammeters 26 respective indications, the relative rate of oxide formation to the plating rate of the arsenic is controlled to determine the electrical properties of the contaminated metallic oxide layer.

In testing some of the above described oxide coatings, it has been found that by increasing the volumetric proportion of the arsenic, i.e., oxide contaminate or donor impurity, to the dielectric and metallic oxide, the asymmetry of the layer resistance, i.e., front-to-back ratio, decreases toward unity wherein the layer is a symmetric impedance. In using arsenic as the contaminate and an aluminum oxide as the dielectric oxide host, such a symmetric impedance is formed when the volume of contaminate and of oxide are equal.

In forming rectifying barrier layers, i.e., ones with asymmetric impedances as measured in opposite directions through the layer, it is preferred that the contaminate plating current magnitude through the anode 18 be kept from 0.1 to 0.05 of the anodizing cathode 16 current magnitude. The latter current ratio provides a rectifying layer which is suitable for constructing an in-line power rectifier for use in television sets and similar appliances. Smaller amounts of contaminate in the oxide provides resistive asymmetry to the electrical layer but with apparently reduced current handling capabilities.

In constructing one rectifier, according to the above described method, an aluminum electrode consisting of a rod four inches long and one-half inch in diameter was plated in a 15% sulphuric acid bath at room temperature by using a 60 volt battery B2 and providing a 1,000 ampere current through the anodizing cathode 16 and an anode 18 current of 100 amperes. The rod was removed from the bath and copper foil was wrapped around the formed electrical layer in a contiguous relationship thereto resulting in a device exhibiting asymmetric resistance, i.e., an electrical current rectifier.

In a second test an identical rod was used to support an electrical layer in which the arsenic plating current through the anode 18 was 50 amperes, i.e., 0.05 of the anodizing current, resulting in an increased degree of resistive asymmetry. The resistive impedance magnitudes, in both directions through the layer, are changed by modifying the oxide coating radial thickness; increasing the radial thickness increases the resistive impedance both in the radially inward and outward directions.

A third test was conducted at room temperatures wherein two one-half inch aluminum rods, one and one-half inches long, were plated with a cathode 16 to anode 18 current magnitude ratio of 10 to 1 for forming two rectifying layers. A copper foil was wrapped around each in contiguous and electrical-contact-forming relation to the arsenic contaminated aluminum oxide coatings for forming two barrier layer rectifiers. The two rectifiers were installed in a full-wave rectifying circuit of a 24 inch television set for providing the plate supply current to the entire low voltage system. The set was operated for one hour and with each rectifier providing a half-wave rectified voltage of 375 volts and passing a current of greater than 275 milliamperes with no adverse effect either to the set operation or to the rectifiers. These small rectifiers replaced a full-wave selenium stack rectifier having a substantially greater physical size and operated at a temperature such that a person would be burned if the rectifiers were touched.

One advantage of rectifiers constructed according to the present invention is that they are unaffected by various environmental conditions such as high temperatures and corrosive atmospheres. While the fusion temperatures, or melting points, of aluminum and copper are respectively 675° C. and 1080° C., the fusion temperature of aluminum oxide is 2030° C. which is somewhat lowered by the arsenic contamination.

Thus, it is seen that the fusion temperature of the barrier layer is substantially higher than that of the connecting electrodes. Further the anodized coating is extremely resistant to any corrosion and abrasion.

In conducting tests for making rectifiers according to the described processes several other donor impurities were used namely: boron, magnesium, silicon, chromium, cobalt, copper, zinc, arsenic, tin, antimony and barium. All of the above listed metals provided some degree of asymmetric resistance within the barrier layer. It may be noted that at least one of the above listed metals is in each of the groups I–VIII of the Periodic Table of Atomic Weights and include both electrical conductors and semi-conductors. While the exact reason why the contaminated metallic oxide having a dielectric property provides the described asymmetric resistance is not known, it is believed that in the electroplating process the metal to be deposited becomes integrally formed into the crystal lattice of the oxide. In this respect alloys of metals, whether conductors or semi-conductors, will also provide the asymmetric resistance.

Since the metal contaminate has to be integrated into the oxide crystal lattice, is is preferred that the anodized oxide forms a relatively porous coating, as can be provided by anodizing at a relatively rapid rate. It has been found that forming an oxide coating at the rate of 1 mil thickness very three-fourths hour provides excellent results in constructing rectifiers according to this invention. It is believed that the increased porosity of the oxide permits the electrolytic action to permeate the layer.

The following described processes were also successful in forming a rectifying and a linearly resistive barrier layer by electrolytic processes at room temperatures. In a second process an aluminum rod was first plated with a metallic contaminate, such as arsenic, and then the plated rod was immersed into a 15% sulphuric bath and subjected to anodization. The contaminate was distributed throughout the oxide, or crust, and is believed to have formed a part of the crystal lattice thereof. Referring momentarily to the FIG. 1, it may be noted that this process may be performed in the described apparatus by first causing the anode 18 to plate the arsenic on the electrode 14 and then causing current to flow from the cathode 16 to the electrode 14 for anodizing same.

In a third process the aluminum rod was first anodized and then the contaminate was plated throughout the oxide coating while the anodized rod was immersed in an electrolyte. It is well known, of course, that aluminum oxide when formed by anodization is a good dielectric. It was found, however, that when a porous aluminum oxide coating is immersed into an electrolyte, such as a 15% sulphuric acid bath, there is sufficient dielectric breakdown to permit a plating current to flow through. Referring again to FIG. 1, the illustrated apparatus can be used to perform this latter process by first anodizing the electrode 14 and then causing current to flow through the arsenic anode 18.

A fourth process for forming a rectifying barrier layer consists of first anodizing an aluminum rod and then immersing the rod into a solution which contains a reducing agent, such as sulphuric acid, plus a metal contaminate hydroxide, often termed a precipitate. In this process, it is important that the oxide coating, or crust, should be relatively porous. This latter process has not been as successful as the above described processes.

A fifth process consists of making the electrode 14 of an aluminum alloy and then anodizing said electrode in a sulphuric acid bath. The metal, or metals, alloyed with the aluminum in the rod form the contaminate and will be distributed throughout the anodized coating in the same manner as hereinbefore described for the other processes.

In the rectifiers constructed according to the above described methods of processes wherein the current flow was to the anodizing cathode 16 from the anodized electrode 14, the forward direction of the barrier layer, i.e., the direction of least resistance, for conventional current is from the outside layer inwardly through the oxide coating to the aluminum rod. To reverse the forward direction of the barrier layer all one has to do is to reverse the anodizing current flow between the electrode 14 and the cathode 16 when making the rectifier.

An alternate apparatus in which the methods of this invention may be performed is shown in FIG. 3 wherein the zinc anodizing cathode 16' constitutes a tank for holding the sulphuric acid bath 12, while the arsenic anode 18' and the aluminum electrode 14 are mounted on the insulating supports 19' as described for FIG. 1. The batteries B1 and B2 are connected through the reversing switches 30 and 30' to the electrode 14' and the cathodes 16' and anode 18', respectively. The switches 32 and 34 respectively control the current flowing through the electrodes 16' and 18'. By simultaneously closing both switches the electroplating processes identical to the one first described for FIGS. 1 and 2 is accomplished.

By actuating the reversing switch 30 the rectifying properties of the electro-plated layer 28 formed on the anode 14 may be determined. Momentarily throwing the switch 30 such as to reverse the polarity between the electrode 14 and cathode 16' and noting the respective current magnitudes indicated by the ammeter 36 before and after polarity reversal, the front-to-back ratio is indicated. To increase the ratio the switch 32 is opened and the switch 34 is closed with the switch 30' connecting the battery B1 to the tank such that the anode 18 is negative with respect to the electrode 14. This reverses the direction of ion flow removing the arsenic from the coating 28 and redepositing it on the cathode 18. In so doing, the battery B1 voltage should be adjusted to provide the same current magnitude through the anode 18 as was provided in the initial deposition. It may be noted that the thickness of the aluminum oxide coating 28 remains substantially the same.

A typical electrical circuit application of the subject invention is shown in FIG. 4 wherein the rod 14 has one end threaded and screwed into a grounded chassis portion 38 and with a copper foil 40 wrapped around and being in contiguous electrical-contact-making engagement with the annular barrier layer 28. An alternating signal source 42 is connected through a load 44 to the foil 40 and with the source other end being connected to the portion 38 for providing a half-wave rectified electrical current through the load. The rod 14 which consists of aluminum provides a very convenient heat sink for the rectifier assembly.

A full wave electrical current rectifying device is shown in FIG. 5 wherein a first tubular rod 46 has one of its inner end portions 48 tapped for receiving the threaded member 50 to mount same on a grounded chassis portion 52. A rod 54 is snuggly fitted inside the other portion 56 of the tubular rod 46. The inner surface 57 has a rectifying barrier layer plated thereon as aforedescribed. A second tubular rod 58 is snuggly fitted over the outer surface 60 of the rod 46 and on which a second rectifying barrier layer has been plated. In fact, the whole end portion 56 may have a continuous barrier layer plated thereon such as to form a conductive layer between two barrier layers. The end portion 48 is preferably fitted against the portion 52 for making an electrical grounded connection therewith. The rods 54 and 58 are respectively and electrically connected to opposite ends of an electrical transformer secondary winding 62. A suitable load 64 is connected between the portion 52 and the center-tap of the winding 62 for receiving a full-wave rectified current from the alternating current source 66. An insulating stopper 68 may be provided between the rod 54 and the threaded member 50 for preventing an electrical contact therebetween.

Referring again to FIG. 4, the illustrated device may be modified to provide transistor action by inserting a battery 70 between the foil 40 and the load 44, providing an annular and axially thin insulating layer 72 at an axially intermediate point of the rod 14 and then connecting the formed annular portion 74 to the signal source 42 and the load 44 as at 76. The portion 74 may be an aluminum tube 74 snuggly fitted over the coating 28. It should be readily apparent that the resulting transistor will be used in its grounded-base circuit configuration.

It is preferred that the annular insulating layer 72 has an axial length of less than two mils, such as could be provided by anodizing the end of the tube 74 to form aluminum oxide and causing it to contact the foil 40. As such the rod 14 is the base electrode, the portion 74 the emitter and element 40, the collector.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A high temperature barrier layer rectifier comprising first and second electrically conductive electrode members, said first member being comprised of aluminum and said members being separated by a rectifying barrier layer comprised of a dielectric aluminum oxide portion of said first member and a uniformly distributed metallic donor impurity contained therein whereby said rectifying barrier layer is comprised of a substantially homogeneous mixture of said dielectric aluminum oxide on said first member and said metallic donor impurity.

2. The article of claim 1 in which the metallic donor impurity is substantially less than one-half of the volume of the rectifying barrier layer.

3. A high temperature semi-conductor device including an aluminum supporting electrode comprised of a conductive metallic layer and a layer comprised of aluminum oxide having a metallic donor impurity uniformly distributed therethrough and a further conductive electrode disposed on the aluminum oxide layer on said supporting electrode.

References Cited by the Examiner

UNITED STATES PATENTS

| 2,005,279 | 6/1935 | Van Geel et al. | 317—230 |
| 2,299,228 | 10/1942 | Gray et al. | 317—230 |
| 2,349,083 | 5/1944 | Farr | 204—58 |
| 2,433,752 | 12/1947 | Gall et al. | 317—235 |
| 2,464,377 | 3/1949 | Cohen et al. | 317—101 X |
| 2,493,076 | 1/1950 | Lazarus | 317—238 |
| 2,504,178 | 4/1950 | Burnham et al. | 317—230 |
| 2,692,851 | 10/1954 | Burrows | 204—58 |
| 2,887,632 | 5/1959 | Dalton | 317—238 |
| 2,931,958 | 4/1960 | Arthur et al. | 317—234 |
| 2,937,324 | 5/1960 | Kroko | 317—234 |

FOREIGN PATENTS 479,993  10/1951  Italy.

DAVID J. GALVIN, *Primary Examiner.*

LLOYD McCOLLUM, JAMES D. KALLAM,
*Examiners.*